Dec. 5, 1967  W. T. WEISMANN  3,356,875
APPARATUS CONTROL MECHANISMS
Filed April 3, 1964  2 Sheets-Sheet 1

INVENTOR.
WALTER T. WEISMANN
BY Harry M. Saragovitz
Edward Kelly, Herbert Berl,
& S. Dubroff
ATTORNEYS Dec. 5, 1967  W. T. WEISMANN  3,356,875
APPARATUS CONTROL MECHANISMS
Filed April 3, 1964  2 Sheets-Sheet 2
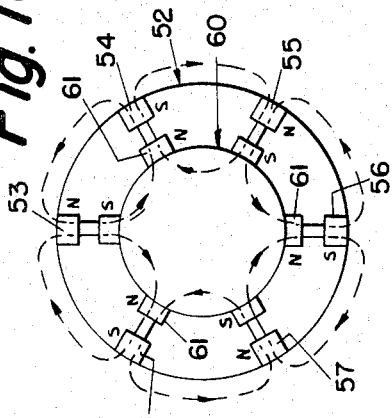
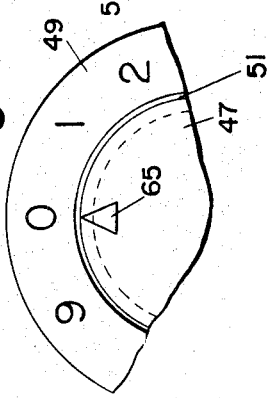
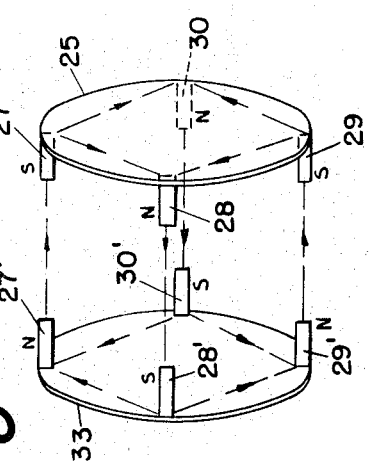
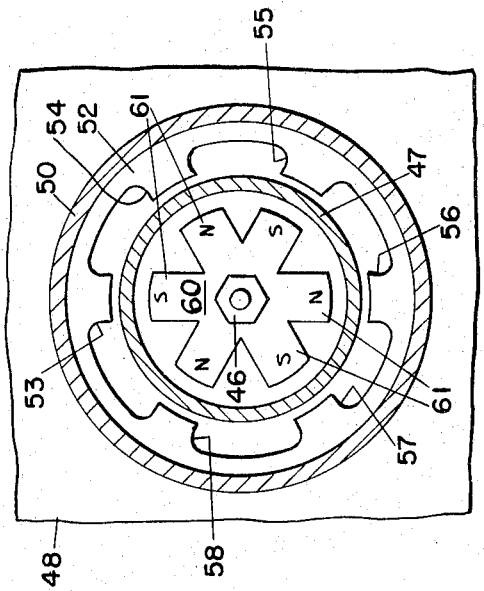
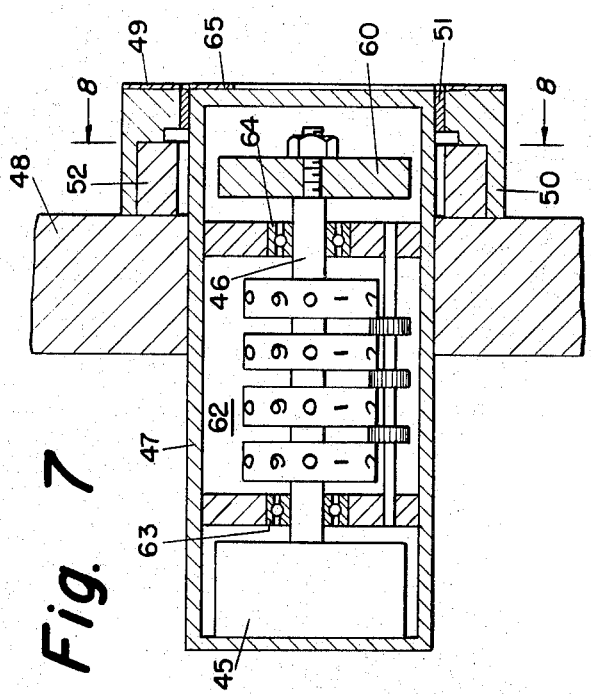
INVENTOR.
WALTER T. WEISMANN
BY Harry M. Saragovitz
Edward Kelly, Herbert Berl,
& S. Dubroff
ATTORNEYS

United States Patent Office

3,356,875
Patented Dec. 5, 1967

3,356,875
APPARATUS CONTROL MECHANISMS
Walter T. Weismann, Hackettstown, N.J., assignor to the United States of America as represented by the Secretary of the Army
Filed Apr. 3, 1964, Ser. No. 357,332
3 Claims. (Cl. 310—104)

ABSTRACT OF THE DISCLOSURE

A control system providing effective control of internal mechanisms in hermetically-sealed armored and like enclosures. A non-magnetic cylindrical casing is adapted to project through a wall of the enclosure to expose one end on which a control knob of non-magnetic material and dial means are mounted to rotate, with the casing acting directly or indirectly as a hub therefor. An internal control mechanism in the casing is provided with a central operating shaft coupled by magnetic-linkage with the external control knob through inner driven and outer driver elements connected respectively with the said shaft and the control knob, with the latter providing an enclosure for the outer driver element. Each of the magnetic elements comprises a plurality, such as six, equally-angularly spaced extended magnetic poles of alternate North and South polarity at the tip ends thereof and integral magnetic structural means joining said poles in common at the base ends thereof, and all poles of both elements preferably are arranged in the same plane normal to the axis of the shaft and casing.

---

Figure 5:
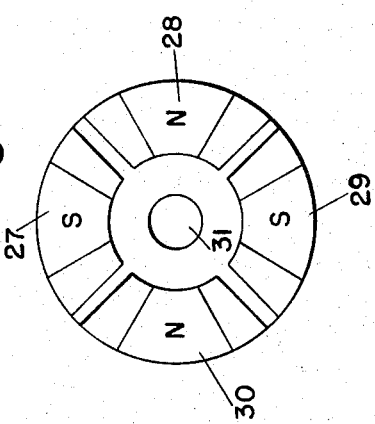

The invention described herein may be manufactured and used by or for the Government for governmental purposes without the payment to me of any royalty thereon.

The present invention relates to apparatus control mechanisms. More particularly, the present invention relates to a system for presetting hermetically-sealed or armored control mechanisms in miiltary digital computer, gun-fire control, signal transmitter and like apparatus, and dial-locked safes and compartments therefor, and has for its primary object to provide an improved system of that type.

In apparatus for which the system of the present invention is adapted, hermetically-sealed or armored housing means are provided with internal control mechanisms which must be preset or operated from the exterior thereof without impairing or in any way adversely affecting the protection provided by the sealing or the armor.

It is, therefore, an object of this invention, to provide an improved control system for sealed or armored apparatus of the types referred to, whereby the internal control elements or mechanisms thereof may be preset by external means devoid of any mechanical or electrical circuit connection therewith.

It is a further object of this invention to provide a control system of the above type in which an improved form of magnetic coupling is established between the internal control mechanism and an external indicator or dial element for presetting said mechanism, and wherein the indicator or dial element is readily detected for security and safety purposes.

The internal control mechanisms of the apparatus concerned is preferably of the rotary type, that is, having a rotary control shaft or element by which it is operated or preset, and to which a magnetic coupling element may be attached or connected for rotation therewith. The other or outer magnetic coupling element is attached to or connected with the external indicator or dial element of the system and rotatable therewith in coaxial relation to the internal element and the control mechanism.

To assure positive operation at all times, in accordance with the invention, a high degree of magnetic coupling, which admits of applying an adequate and relatively strong driving force or torque therethrough, is provided between the internal and external moving or magnetic coupling elements of the system. These elements are, furthermore, of the multipolar type, having salient radial or longitudinally-extending spaced magnetic arms or poles. These are equal in number on the internal and external elements and aligned to provide a plurality of closed magnetic loops or circuits linking the said elements and establishing the high degree of coupling referred to and corresponding adequate torque.

The magnetic linking flux may be provided by one or both magnetic coupling elements by making one or both as permanent magnets in proper polarity relation to establish the closed flux paths or loops referred to. In any case, the magnetic coupling elements are mounted to rotate about a common fixed axis with the operating shaft or rotary control element of the internal control mechanism, and with the radial or longitudinally-extending arms or poles in alignment end-to-end. The spacing or gaps between the ends of the poles due to the intervening wall or barrier of the apparatus housing or hermetical sealing structure are maintained a substantial minimum to improve the magnetic coupling. Even with wider gaps due to the housing or sealing structure wall thickness, the multiple number of relatively short flux paths provide adequate coupling force or torque. To enhance this force, duplicate permanent magnet elements in connection with the inner control mechanism and the outer dial or control element are desirable.

The removal of the combination or preset dial element from the apparatus leaves no visible operating means or indication of the operating range or function of the apparatus. Thus this is an additional safety or security feature of value in military and like equipment and apparatus.

The control system, according to the invention in one form, thus includes an internal rotary control mechanism, a multipolar outer rotary driver element of the magnetic coupling means, a corresponding multipolar inner rotary driven element of said coupling means mounted for rotation in coaxial relation to the outer element and said control mechanism, manual means for rotating the outer magnetic driver element connected therewith and including an indicator or dial for setting said mechanism, and means connecting the inner magnetic driven element with said control mechanism to drive it to a preset position in response to a setting of said dial, through the multipath magnetic coupling between said driver and driven elements.

The invention will further be understood from the following description of certain embodiments thereof when considered with reference to the accompanying drawings, and its scope is pointed out in the appended claims.

Figure 3:
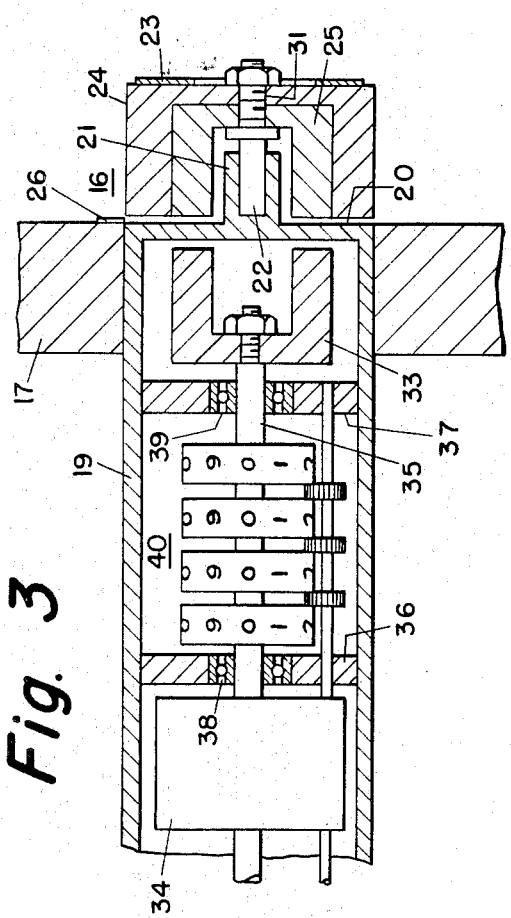
Figure 4:
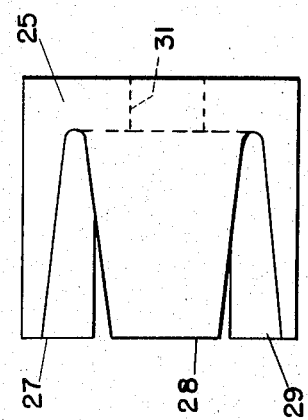
Figure 2:
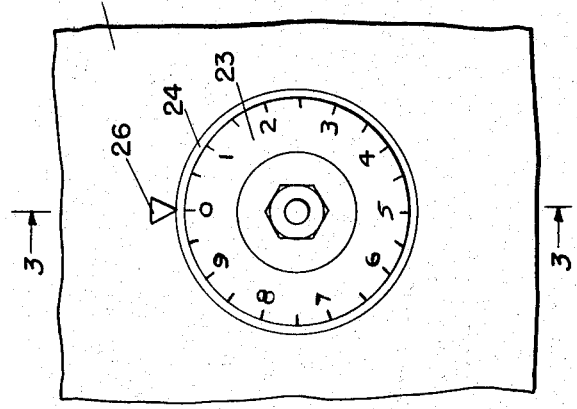
Figure 1:
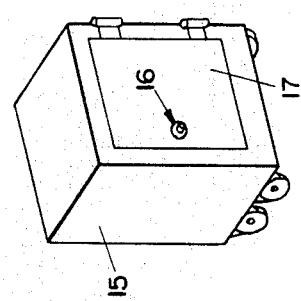

In the drawings:

FIG. 1 is a view, in perspective, of an armored casing or safe provided with a system for presetting an internal control mechanism thereof, in accordance with the invention, FIG. 2 is an enlarged view of a portion of the front of the casing of FIG. 1 showing a dial or outer control means for the system in operative position, in accordance with the invention, FIG. 3 is a longitudinal sectional side view of the internal control mechanism and control means therefor as provided for the apparatus of FIGS. 1 and 2, taken on the section line 3—3 of FIG. 2, FIGS. 4 and 5 are side and end views, respectively, and on an enlarged scale, of a magnetic coupling element of FIG. 3 showing further constructional details thereof in accordance with the invention, FIG. 6 is a schematic representation of the magnetic coupling elements of FIG. 3 in operative coupled relation to provide, in the control system shown, a plurality of magnetic coupling loops, FIG. 7 is a longitudinal sectional side view of a modification of the control system, similar to that of FIG. 3, showing a different application of the invention, FIG. 8 is a sectional front view of the control system shown in FIG. 7, and taken on the section line 8—8 thereof to show further constructional details in accordance with the invention, FIG. 9 is a fragmentary front view of a dial element of the system structure shown in FIG. 7, to illustrate its relation to other elements in this modification, and FIG. 10 is a schematic representation of the multipath magnetic coupling means in accordance with the invention, as provided in the control system shown in FIGS. 7 and 8.

Referring to the drawings, wherein like parts or elements, throughout the various figures, are designated by like reference numerals, and referring particularly to FIGS. 1, 2 and 3, an armored apparatus housing 15, as shown in FIG. 1, is provided with a control system 16 mounted in a wall or door 17 thereof for operating an internal lock or control mechanism, as the case may be, in accordance with the invention. As further shown in FIGS. 2 and 3, this includes a closed, rearwardly-extending cylindrical casing 19 for the mechanism, of non-magnetic material, such as hardened aluminum, with the forward closed end or end wall 20 flush with the front face of the wall or door 17.

The casing is provided with or carries on said end wall 20, a central forwardly-extending hollow stud or socket element 21 in which is detachably seated a short pivot pin or shaft 22 for a unitary rotary outer and detachable control element. This includes a rotary dial 23 graduated to indicate positional settings for the particular control mechanism and apparatus concerned. In the present example, the dial is carried on the flat outer face of a cylindrical manual control knob 24, of non-magnetic material, mounted on the pin or shaft 22 to rotate therewith, and is connected to rotate with a rotary magnetic coupling element 25 and coaxial therewith on the shaft 22. A fixed pointer element 26 for the dial is provided on the wall 17 as shown. A reversal of the positions of these indicator elements for setting the internal mechanism may be made in cases where removal of the dial for security purposes is not important.

The coupling element 25 is of circular form and is contained within the hollow interior of the knob 24, as indicated in FIG. 3. It is provided with four equally-spaced longitudinally-extending poles or arms 27, 28, 29 and 30 which terminate close to the casing wall 20, but with sufficient clearance to rotate freely with the indicator element, which is the dial 23 in the present example, and the control knob. As shown more clearly in FIGS. 4 and 5, to which direction is directed, the poles 27–30 project longitudinally from the main body or web of the coupling element 25, which is provided with a central opening for the shaft 22. The poles are preferably tapered outwardly as shown.

A like and complementary multipolar inner rotary driven element 33 of the magnetic coupling means is mounted for rotation in coaxial relation to the element 25 and the control mechanism 34 of the apparatus. The two coupling elements are on opposite sides of the end wall 20 of the casing 19 for the internal control mechanism, with the poles in end-to-end spaced relation as indicated in FIG. 3 and coupled through the non-magnetic material of the wall. The polarities of the magnetic coupling may be set up as hereinafter described, and any even number of poles may be provided to give a multipath magnetic coupling connection between the inner and outer elements and a desired degree of control of the inner mechanism from the exterior thereof, without impairing any desired hermetic sealing or protection by armor or casing means.

In the present example, the control mechanism 34 is connected to be driven by the inner coupling element 33 through the rotary control element or shaft 35 thereof, on the forward end of which the coupling element 33 is mounted as shown. The shaft extends axially or longitudinally of the casing 19, and through suitable spaced support or guide bearings 38 and 39 in transverse walls or partitions 36 and 37, respectively, in the casing. The control mechanism may also include a counter or indicator means 40 on the same shaft, and operable therewith. Thus a combination for the control mechanism proper may be set up in advance and selected by the control dial and indicator on the exterior of the casing. In the present example the control mechanism may be for the locking means of the apparatus or safe.

In FIG. 6, the poles 27', 28', 29' and 30' of the inner driven coupling element 33 corresponding respectively to the poles 27, 28, 29 and 30 of the outer driven coupling element 25, are shown in the polarity relation and provided by the elements of FIGS. 3, 4 and 5 hereinbefore mentioned. This provides a multipath magnetic coupling effective to link the two elements together with sufficient strength for full response of the driven element to movement or rotation of the driver element, substantially regardless of the gaps interposed by the casing wall 20, for example. The arrowed dash lines indicate the four linking magnetic circuits provided by the polarity relation of the present example.

It will be seen that an improved system for presetting hermetically sealed or armored control mechanisms adapted for military digital computer, gunfire control, signal transmitter and like apparatus, and security-locked safes and compartments therefor, may be provided as shown in the present example. Rotation of the outer dial or indicator means serves to positively drive and set the inner mechanism because of strong and effective magnetic coupling through the necessary spacing between pairs of poles in the loops. The inner and outer coupling elements of the present example are of like construction with tapered longitudinally extending poles. For maximum strength in the coupling, both may be permanent magnets. A larger number of poles and coupling links may be used and in radial configuration, with certain advantages, as will be seen from a consideration of the modification of FIGS. 7, 8 and 9, to which attention is directed.

The internal control mechanism 45 of the apparatus may be a timer, for digital computer means, having a rotary control shaft 46 and a closed and hermetically-sealed cylindrical casing 47 of non-magnetic material extending through the armor or apparatus housing wall 48, externally, to provide a hub or mount for the detachable external indicator element and control means. This includes the dial 49, per se, on the forward or outer face of a rotary ring-like control knob or carrier 50 provided with an inner bearing contact 51 with the outer surface of the casing 47 abutting the wall 48.

The knob 50 provides a cylindrical inner recess for receiving and holding the outer ring-like magnetic coupling element 52. This is provided with radially-inwardly projecting salient poles 53–58 and may be of soft unmagnetized iron or like readily-conductive magnetic material, or may be permanently magnetized and of suitable magnetic material for this purpose such as the nickel-steel alloys available commercially.

The inner or internal magnetic coupling element 60 of this modification has a corresponding number of salient radial poles 61 aligned with the poles 53–58 in an alternate North and South polarity relation as indicated, and which establish the coupling links or magnetic coupling pattern as indicated in FIG. 10. Here the dash-and-arrow lines show the multiple number of short magnetic flux paths which strongly link the outer and inner coupling elements and provide a high degree of magnetic coupling for effective and positive drive. In this diagram, also, it is indicated that the outer coupling element 52 of permanent magnetic construction for stronger coupling, whereas in FIG. 8 the inner coupling element is of the permanent-magnet type and thus furnishes the magnetic flux and the coupling force. In either case, the magnetic flux paths have the same pattern and direction as shown in the example given.

Also in this modification, the internal control mechanism 45 may be provided with program or setting indicator means, such as a digital counter section 62 as shown in connection with the shaft 46. The control shaft 46 may also be connected directly to the coupling element 60 which is in the plane of the external coupling element 52, and thus is rotated with the salient pole areas of the two coupling elements in alignment for maximum coupling and torque. The control shaft 46 may also be provided with spaced guide bearings 63 and 64 as in the preceding embodiment.

The elements of the indicator means include the dial 49 and a pointer 65 associated therewith and fixed to the outer end of the casing 47. Thus the dial 49 rotates with the knob element 50 in the present example. Obviously a reversal of these elements may be used where desirable or permissible as mentioned hereinbefore. In any case, the setting or presetting of the inner control mechanism is made with reference to the indicator means which is connected to and rotates with the external magnetic coupling element.

The indicator means, or dial in the present example, may be removed by withdrawing the unit comprising the elements 49, 50 and 52 from the outer or exposed end of the casing 47. The bearing means 51 may be a finished internal surface area of the ring or knob 50, or a suitable plastic or metal ring, providing a smooth sliding and rotating fit on the hub provided by the casing 47.

Like the setting indicator element or dial 23 of the embodiment shown in FIG. 3, the setting indicator element or dial 49 of the embodiment shown in FIG. 7 may be removed after each setting operation by withdrawing the knob, coupling element and indicator element as a unit. As a safety or security feature, this leaves no visible operating means for the apparatus and the particular control mechanism, and no indication of the operating range or function thereof when the dial element, per se, is removed.

Furthermore, as shown and described herein, in addition to the above feature which is provided without complicated construction, the improved control system of the present invention, provides for effective control of internal mechanisms in hermetically-sealed, armored and like enclosed apparatus without impairing or adversely affecting the protection afforded by the sealing or the armor.

I claim:
1. A control system for presetting internal mechanisms in safe and like walled enclosures comprising in combination, an elongated cylindrical closed casing of non magnetic material adapted to be mounted in and extend at one end through a wall of an enclosure, an internal rotary control mechanism enclosed and protected by said casing and having a rotary control shaft extending longitudinally therefrom, rotary magnetic coupling means including a multipolar outer magnetic driver element and a corresponding multipolar inner magnetic driven element mounted for rotation in coaxial relation on a common axis with the casing and said rotary control shaft, said magnetic driver and driven element being constructed to provide a high-torque multipath magnetic linkage therebetween and each comprising a plurality of equally-angularly-spaced extended magnetic poles of alternate North and South polarity at the tip ends thereof and integral magnetic structural means joining said poles in common at the base ends thereof, a detachably removable cylindrical outer control knob of non-magnetic material coaxial with and surrounding said outer driver element to apply rotary motion thereto and including a graduated dial for setting said mechanism, and means connecting the inner magnetic driven element with the rotary control shaft of said mechanism to drive said shaft to a preset position in response to corresponding movement and setting of said dial by said control knob.

2. An apparatus control system as defined in claim 1, wherein the outer control knob for rotating the outer magnetic driver element and dial further surrounds and rotates on said one end of the cylindrical casing as a hub and is detachably removable therefrom.

3. A control system for presetting internal mechanisms, as defined in claim 2, wherein the inner magnetic driven element is provided with at least six poles radially-extending outwardly from said common axis in substantially-equal angular spaced relation in a common plane normal to said axis, and wherein the outer magnetic driver element is provided with an equal number of equally-spaced poles radially-extending inwardly toward said axis and in end-to-end relation therewith in said plane to establish said multipath magnetic linkage.

References Cited

UNITED STATES PATENTS

| 2,026,932 | 1/1936 | Cisor | 70—332 |
| 3,273,363 | 9/1966 | North | 70—330 |

FOREIGN PATENTS

| 1,103,074 | 5/1955 | France. |

DAVID X. SLINEY, *Primary Examiner.*